United States Patent
Li et al.

(10) Patent No.: US 9,620,998 B2
(45) Date of Patent: Apr. 11, 2017

(54) MOTOR COOLING AND EDDY CURRENT SUPPRESSION STRUCTURE

(71) Applicant: HARBIN INSTITUTE OF TECHNOLOGY, Heilongjiang (CN)

(72) Inventors: Liyi Li, Heilongjiang (CN); Donghua Pan, Heilongjiang (CN)

(73) Assignee: HARBIN INSTITUTE OF TECHNOLOGY, Harbin (CN)

(*) Notice: Subject to any disclaimer, the term of this patent is extended or adjusted under 35 U.S.C. 154(b) by 502 days.

(21) Appl. No.: 14/370,582

(22) PCT Filed: Jan. 31, 2013

(86) PCT No.: PCT/CN2013/071174
§ 371 (c)(1),
(2) Date: Jul. 3, 2014

(87) PCT Pub. No.: WO2014/036812
PCT Pub. Date: Mar. 13, 2014

(65) Prior Publication Data
US 2014/0312718 A1    Oct. 23, 2014

(30) Foreign Application Priority Data
Sep. 6, 2012    (CN) .......................... 2012 1 0327456

(51) Int. Cl.
*H02K 1/20*  (2006.01)
*H02K 41/035*  (2006.01)
(Continued)

(52) U.S. Cl.
CPC ................. *H02K 1/20* (2013.01); *H02K 3/24* (2013.01); *H02K 41/0356* (2013.01); *H02K 3/47* (2013.01);
(Continued)

(58) Field of Classification Search
CPC ........ H02K 41/0356; H02K 3/24; H02K 1/20; H02K 9/22; H02K 3/47; H02K 41/03; H02K 41/02; G03F 7/70758; G03F 7/70858
(Continued)

(56) References Cited

U.S. PATENT DOCUMENTS

2004/0218167 A1* 11/2004 Johan Hol .......... G03F 7/70758
355/72
2012/0003091 A1    1/2012 Segovia
2014/0132088 A1*  5/2014 Morel ...................... H02K 9/22
310/12.22

FOREIGN PATENT DOCUMENTS

CN    101795055 A    8/2010
CN    101902095 A    12/2010
(Continued)

OTHER PUBLICATIONS

International Search Report dated Feb. 14, 2013.

*Primary Examiner* — Naishadh Desai
(74) *Attorney, Agent, or Firm* — Troutman Sanders LLP; Ryan A. Schneider; Christopher C. Close, Jr.

(57) ABSTRACT

A motor cooling and eddy current suppression structure (100), which is attached to the surface of the motor winding (201), includes a first cooling plate (101), a second cooling plate (103,104), and a cooling water circuit located between the first cooling plate and the second cooling plate. The cooling water circuit is configured to allow the cooling fluid to pass through. The first and the second cooling plates are both non-magnetic metallic materials. The first cooling plate is divided into a plurality of individual first regions (301, 303) which are corresponding to each pole of the motor by one or more first slits (305) provided on the first cooling plate in the position where the motor poles are combined. Each of the first regions is further divided into an even number of first sub-areas by at least one fist sub-slit (306) where induced electromotive force is generated. Two adjacent first sub-areas in respective first regions are grouped together, and the ends of each first sub-area that has the same polarity are connected in series. The second cooling plate is divided into a plurality of individual second regions which are corresponding to each pole of the motor by one or more (Continued)

second slits provided on the second cooling plate in the position where the motor poles are combined. Each of the second regions is further divided into an even number of second sub-areas by at least one second sub-slit where induced electromotive force is generated. Two adjacent second sub-areas in respective second regions are grouped together, and the ends of each second sub-area that has the same polarity are connected in series. This structure can efficiently reduce the temperature of the motor winding and reduce the induced eddy current.

16 Claims, 9 Drawing Sheets

(51) Int. Cl.
*H02K 3/24* (2006.01)
*H02K 3/47* (2006.01)
*H02K 9/19* (2006.01)
*H02K 9/22* (2006.01)
*H02K 16/00* (2006.01)

(52) U.S. Cl.
CPC ............... *H02K 9/19* (2013.01); *H02K 9/22* (2013.01); *H02K 16/00* (2013.01); *H02K 2201/18* (2013.01)

(58) Field of Classification Search
USPC ..................................... 310/52–64
See application file for complete search history.

(56) References Cited

FOREIGN PATENT DOCUMENTS

| CN | 102255469 A | 11/2011 | |
|----|----|----|----|
| CN | 102882314 A | 1/2013 | |
| NL | EP 1457825 A1 * | 9/2004 | ......... G03F 7/70758 |

\* cited by examiner

MOTOR COOLING AND EDDY CURRENT SUPPRESSION STRUCTURE

CROSS-REFERENCE TO RELATED APPLICATIONS

This application is a US National Stage of International Application No. PCT/CN2013/071174, filed 31 Jan. 2013, which claims the benefit of CN201210327456.X, filed 6 Sep. 2012, each herein fully incorporated by reference.

FIELD OF INVENTION

The present invention relates to the field of motor cooling, and in particular, to a new motor cooling and eddy current suppressing structure.

BACKGROUND OF THE INVENTION

Ultra precision positioning servo system places severe constraints on the amount of heat can be produced by actuator (motor), and its trust control accuracy. FIG. 1 shows the application of linear motor in ultra precision positioning servo system. On the basic frame 10, there are two X-axis linear motors 12 and two y-axis linear motors 13 to drive and locate the load 11 in a desirable position. Excessive motor temperature rise not only affect its reliability, but also impact on the positioning accuracy as well due to the increase in motor's thermal stress. Besides, ultra-precision positioning servo system is using a laser displacement sensor for position measurement, therefore, the temperature rise in the motor's surface will result in ambient temperature changes and affecting the measurement accuracy of the sensor, thus unable to achieve positioning accuracy.

The coreless motor possess of several advantages in terms of minor armature reaction, no cogging force, and great linear relationship between trust and current, however, the loss caused by its high current density become the major obstacle of its development.

SUMMARY OF THE INVENTION

The present invention aims to overcome the deficiencies in the prior art, there is provided a new motor cooling and eddy current suppressing structure.

To achieve the above object, the new motor cooling and eddy current suppressing structure, wherein is mounted on the surface of motor winding, comprising:
a first cooling plate, a second cooling plate and the cooling water circuit located in between the first cooling plate and the second cooling plate; the cooling water circuit wherein configured to allow the cooling fluid to get through; the first and the second cooling plates are both non-magnetic metallic materials; wherein one or more first slits being provided on the first cooling plate in the position where the motor poles are combined, and by which the first cooling plate is divided into a plurality number of individual first regions which are corresponding to each pole of the motor; each of the first regions being further divided into an even number of first sub-areas by at least one first sub-slit where induced electromotive force are generated, two adjacent first sub-areas in respective first regions are grouped together and the ends for each first sub-area that has same polarity are connected in series; and one or more first slits being provided on the second cooling plate in the position where the motor poles are combined, and by which the second cooling plate is divided into a plurality number of individual second regions which are corresponding to each pole of the motor; each of the second regions being further divided into an even number of second sub-areas by at least one second sub-slit where induced electromotive force are generated, two adjacent second sub areas in respective second regions are grouped together and the ends for each second sub-area that has same polarity are connected in series.

Preferably, the motor cooling and eddy current suppression structure can be attached on both the top and bottom of the motor winding.

Preferably, the third cooling plate, which is located in between of the first and the second cooling plates, being cut out the waterways and then using the sealant seal the first and the second cooling plated on each side of the third cooling plate respectively. After these processes, the cooling water circuit then is achieved. In addition, the third cooling plate is non-magnetic metallic materials.

Preferably, the waterways in the third cooling plate are arranged to be parallel to each other and distributed in a serpentine shape. Every adjacent waterways have the opposite water flow.

Preferably, the waterways (via milling method) are arranged on one side of the second cooling plate; then using the sealant seal this side with the first cooling plate in order to form the cooling water circuit.

Preferably, the waterways are arranged to be parallel to each and distributed in a serpentine shape on one side of the second cooling plate; every adjacent waterways have the opposite water flow.

Preferably, the first and the second cooling plates are both non-magnetic stainless steel material.

Preferably, the first, the second and the third cooling plates are non-magnetic stainless steel material.

The beneficial effects of the present invention is that the new motor cooling and eddy current suppressing structure can effectively inhibit the temperature rise of the motor windings. More importantly the application of non-magnetic metallic materials in the motor cooling and eddy current suppression structure will help to reduce the surface temperature of the motor and ensure the structural strength of the motor. When eddy currents are induced by the relative motion between mental material and magnetic field, the present invention could effectively reduce such eddy currents through the following way. Incorporate slits in the cooling plate to control the flow of the eddy current; the cooling plate is then divided into several regions, each region corresponding to a magnetic pole, and then the various regions will be grooved farther into subdivided areas. The basic principle of grooving slits is that group two adjacent sub-regions together in each respective region, then connect the same induced electromotive force polarity end together in each sub-region, in order to reduce the induced eddy current.

This patent can be used in both linear motor and rotating motor or any other type of motors; it can effectively inhibit temperature rise, enhance its reliability and improve thrust density.

DETAILED DESCRIPTION OF THE PREFERRED EMBODIMENTS

FIG. 2 to 10 schematically depict a new type motor cooling and eddy current suppression structure 100 according to one embodiment of the invention, which is mounted on the surface of motor winding 201 according to a particular embodiment of the invention. This new type cooling and suppression structure comprises: a first cooling plate 101; a second cooling plate 103; a cooling water circuit: locate in between the first cooling plate 101 and the second cooling plate 103 for allowing the coolant to get through.

Figure 1:
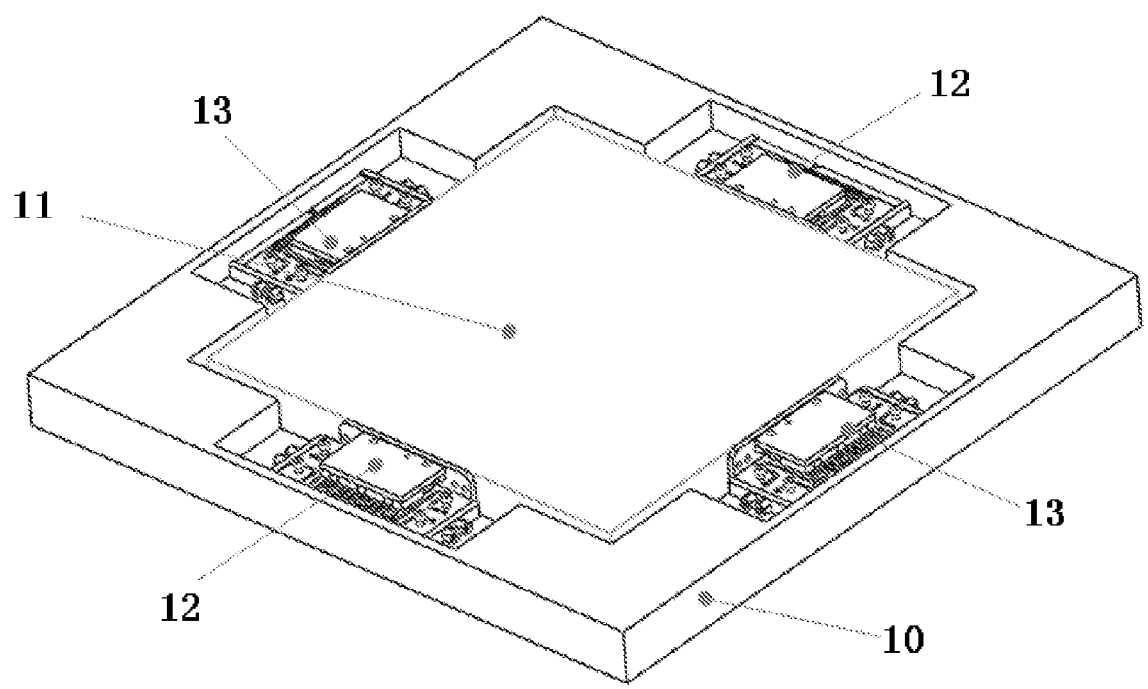
FIG. 1 depicts the application of the existing linear motor in ultra-precision positioning system.
Figure 2:
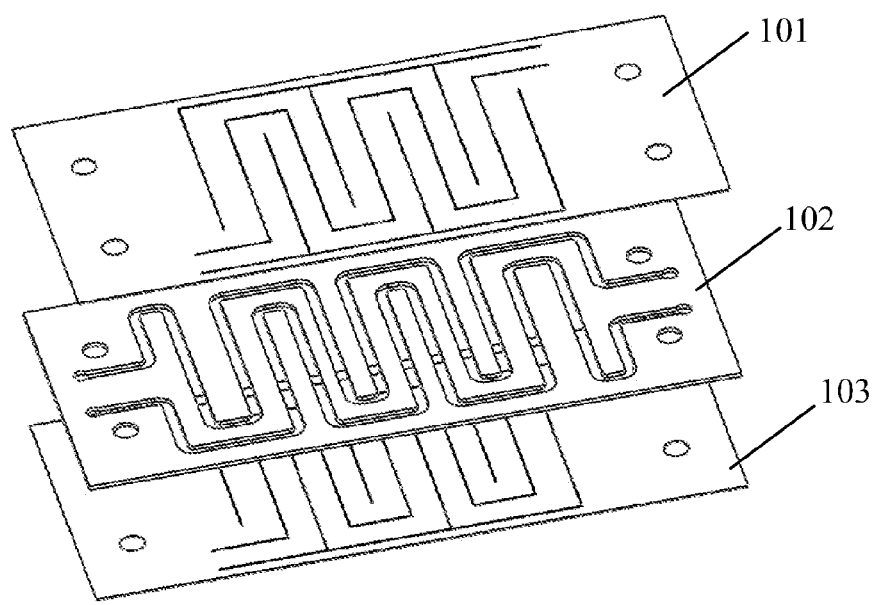
FIG. 2 depicts a novel type cooling plate which can cool coils and suppress the eddy current in first plan.
Figure 3:
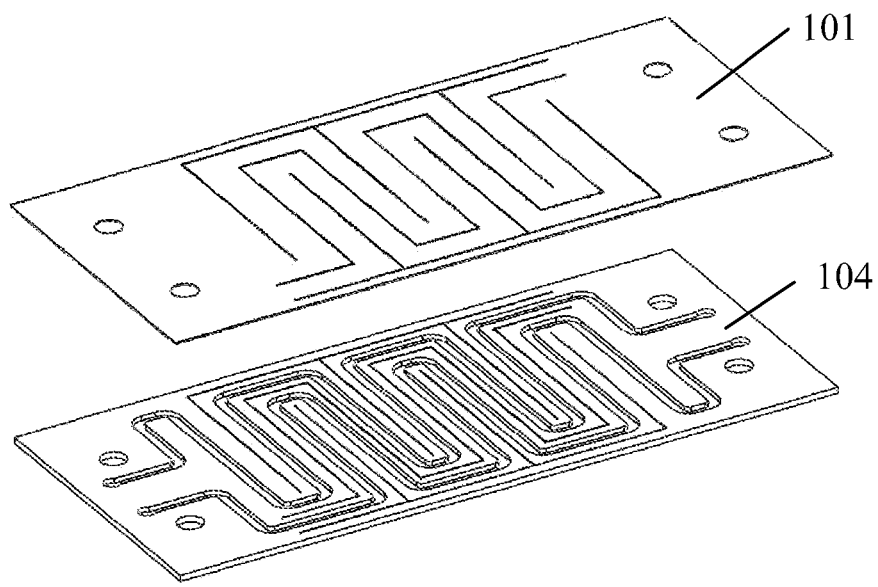
FIG. 3 depicts a novel type cooling plate which can cool coils and suppress the eddy current in second plan.
Figure 4:
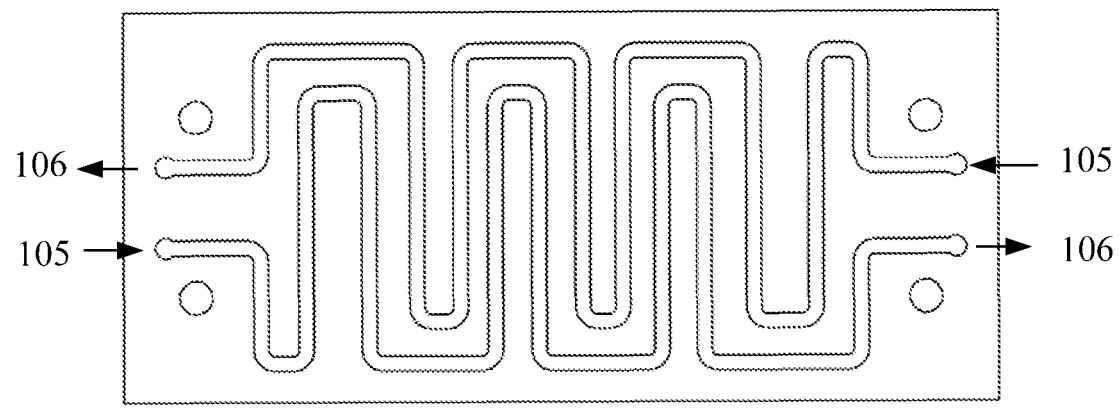
FIG. 4 depicts the distribution of cooling channels in cooling plate which has two cooling channels.

FIGS. 2 and 3 show that the new motor cooling and eddy current suppression structure 100 can be constructed in two different forms.

Figure 5:
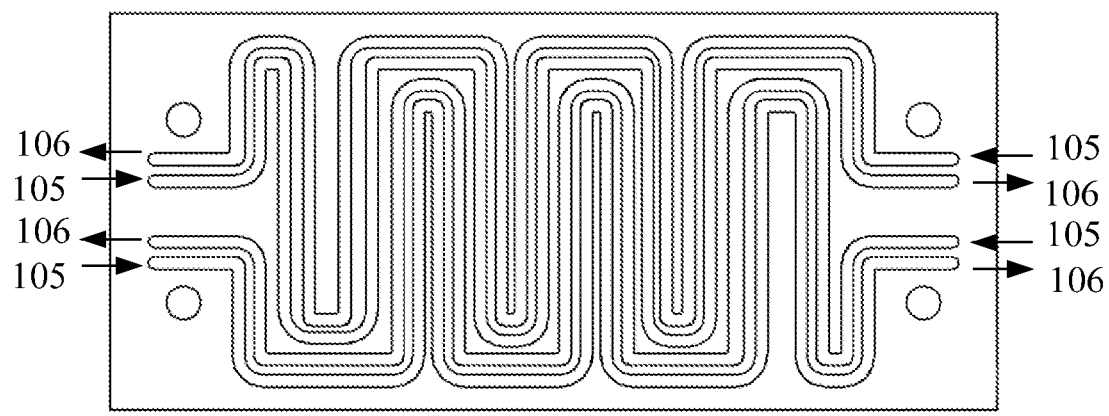
FIG. 5 depicts the distribution of cooling channels in cooling plate which has four cooling channels.
Figure 10:
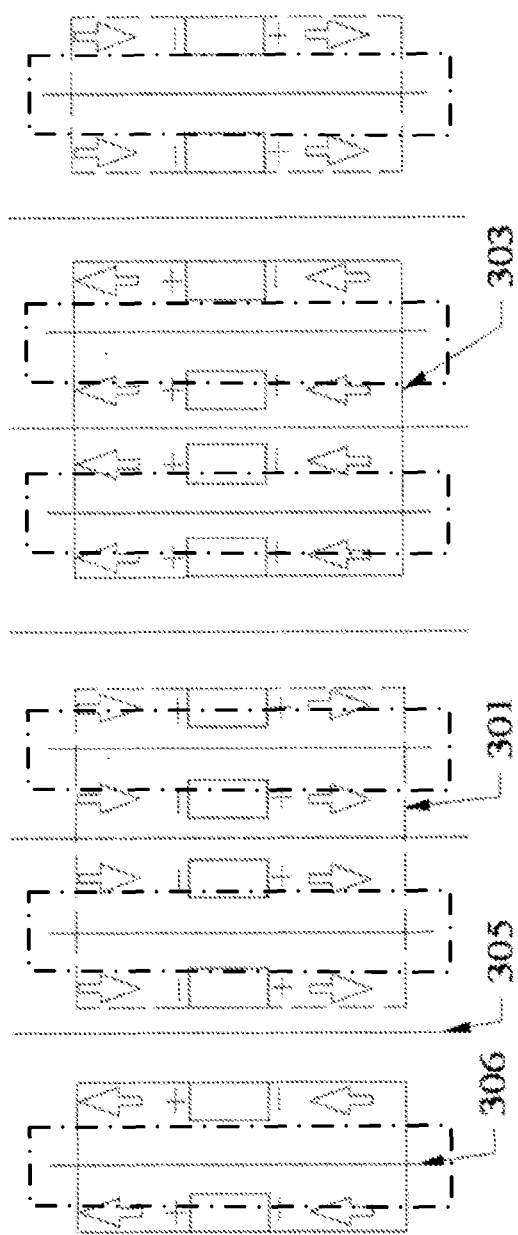
FIG. 10 depicts suppression eddy current principle diagram of the novel cooling plate.
Figure 12:
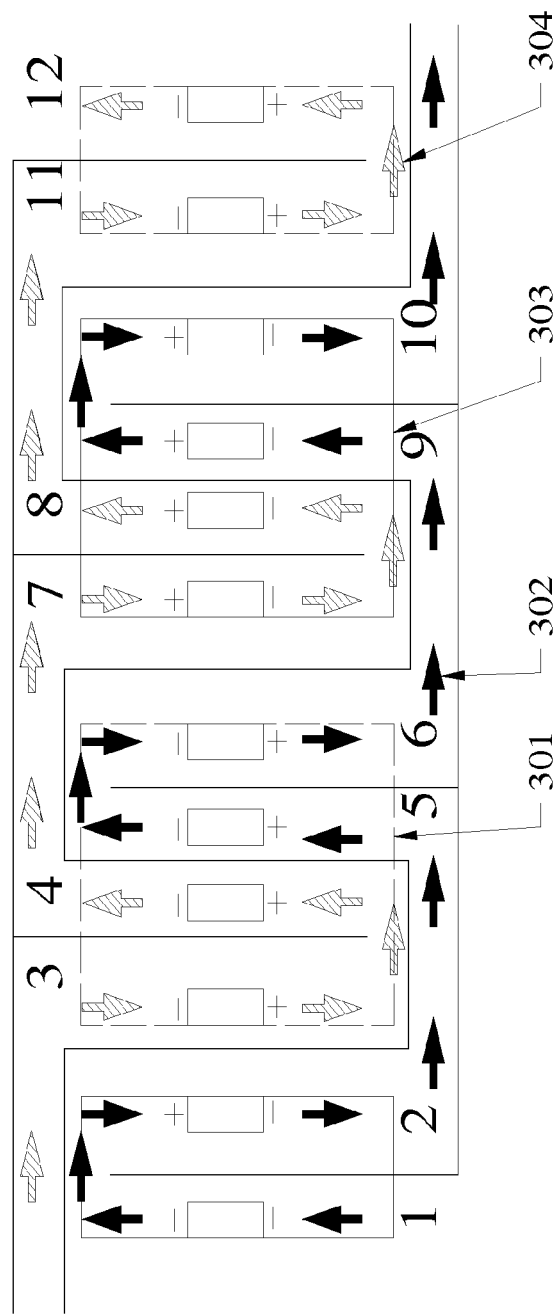
FIG. 12 depicts suppression eddy current principle diagram of FIGS. 2 and 3 cooling plate structure.

As shown in FIG. 2, the new motor cooling and eddy current suppression structure 100 consists of three layers, including the first cooling plate 101, the second cooling plate 103 and a wire-slitted cooling plate 102. By using the sealant, the first and the second cooling plates (101 and 103) are attached to both sides of the third cooling plate 102 in order to form the cooling water circuit within. In FIG. 5 and FIG. 10, the waterways in the third cooling plate 102 are arranged to be parallel to each other and distributed in a serpentine shape. Every adjacent waterways have the opposite water flow. FIG. 12 depicts an arrangement of two serpentine shaped waterways, one is shown as dotted arrows 304 and the other one is shown as solid-line arrows 302. Two waterways have opposite water flows.

In addition, the first, the second and the third cooling plates (101, 103, 102) are all non-magnetic metal material, preferably a non-magnetically permeable stainless steel.

FIG. 3 shows the new motor cooling and eddy current suppression structure 100 in two-layered form. The waterways (via milling method) are arranged on one side of the second cooling plate 104; then using the sealant seal this side with the first cooling plate 101 in order to form the cooling water circuit. As mentioned before, in FIG. 5 the waterways in the second cooling plate 104 are arranged (via milling method) to be parallel to each other and distributed in a serpentine shape. Every adjacent waterways have the opposite water flow. FIG. 12 depicts an arrangement of two serpentine shaped waterways, one is shown as dotted arrows 304 and the other one is shown as solid-line arrows 302. Two waterways have opposite water flow. In addition, the first, the second and the third cooling plates (101, 103, 102) are all non-magnetic metal material, preferably a non-magnetically permeable stainless steel.

The cooling structure is beneficial because it improves the current density from 5 A/mm$^2$ to 20 A/mm$^2$ without cooling structure, thereby enhancing the motor's thrust density by 4 times. Meanwhile, the cooling structure effectively inhibits the surface temperature rise of the motor, when the current density is 20 A/mm$^2$ the temperature rise is controlled within ±1° C. Hence, it also adequately controls the temperature rise in motor winding 201. More importantly the application of non-magnetic metallic materials in the motor cooling and eddy current suppression structure 100 (namely the first cooling plate 101, the second cooling plate 103 and the third cooling plate 102) will help to reduce its surface temperature gradient and ensure the structural strength of the motor 100. Since the eddy current can be induced by the relative motion between mental material and magnetic field; therefore, an element that is able to regulate the eddy current flow is necessary to be incorporated in the cooling structure.

Figure 11:
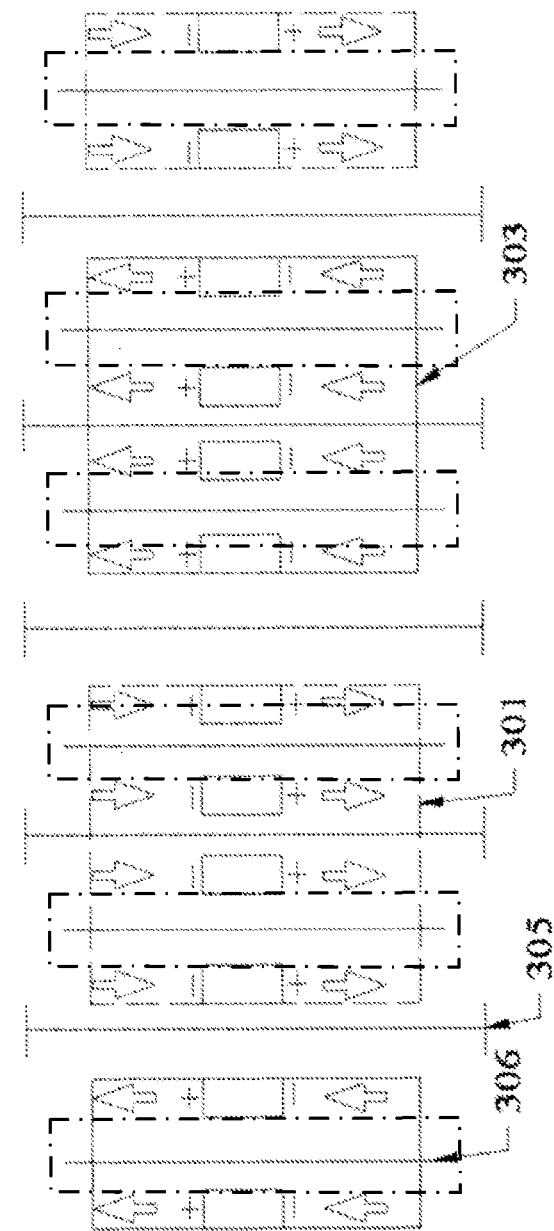
FIG. 11 depicts improvement plan principle diagram of the novel cooling plate.

Take a closer look at the two-layered cooling structure 100 shown as FIG. 3. In FIGS. 10 and 11, one or more slits 305 being set on the first cooling plate 101 in the position, where correspond to the combination of the motor poles. The slits divide the first cooling plate 101 into several individual regions, which are corresponding to each pole of the motor. The individual regions being further divided into an even number sub-areas by using several sub-slits 306. Each sub-area will generate induced electromotive force and group two adjacent sub-areas together in each respective region, then connect the same induced electromotive force polarity end together of each sub-area. Similarly, the second cooling plate 103 being incorporated with one or more slits in the position, where correspond to the combination of the motor poles. The slits divide it into several individual regions, which are corresponding to each pole of the motor. The individual regions being further divided into an even number sub-areas by using several sub-slits. Each sub-area will generate induced electromotive force and group two adjacent sub-areas together in each respective region, then connect the same induced electromotive force polarity end together of each sub-area.

The same grooving method has been employed for grooving the slits in the cooling plates, regardless the number of layers that the cooling structure 100 consists of.

FIG. 10 illustrates the basic principle of how the eddy current paths can be resist in two-layered cooling structure (FIG. 3). When the relative motion between primary and secondary motor occurs, the mental material (namely the first cooling plate 101, the second cooling plate 104) will generate the Synthetic induction electromotive force under the same pole. In this case, those areas where corresponding to the same pole will be further divided into even-numbered sub-regions, this ensures the cocurrent electromotive force could come in pairs and also achieves the reversal connection of the electromotive force. In other words, in each sub-regions, connect like poles together (i.e. Positive-Positive and Negative-Negative) to ensure that there is zero current in the corresponding series circuit and then the resistance of eddy current paths will be realized eventually. In FIG. 10 the solid-line box 303 represents N pole area, whereas the dotted box represents S pole area. From the left, underneath the first N pole magnet there are two sub-regions, wherein the upper side of these two sub-regions is the positive electrode of the induced electromotive force and the lower side is the negative electrode. Connect the like poles together to make the induced eddy current in the loop approaches to zero, so that the resistance of eddy current under the first N pole magnet will be realized. From the left of FIG. 10, underneath the first S-pole magnet, the second N-pole magnet and the second S-pole magnet, each have four sub-areas, four sub-regions, and two sub-areas accordingly. Similarly, connect the like poles together, so that the induced eddy current under each of the magnets will approach to zero.

The induced eddy current may be controlled according to present invention by grooving the slits in the first cooling plate 101 and the second cooling plate 103. Since the slits divided the cooling plates into several regions, where each region correspond to a magnetic pole; further divided those regions into sub-regions in order to group each adjacent sub-regions together and connect the like poles of each group accordingly. Eddy currents are therefore reduced due to the increased resistance of the eddy current paths.

FIG. 11 is an improved version of FIG. 10. Here, the slits 305 are increased in length in order to provide better physical isolation of back electromotive force and resist the eddy current in a more efficient manner.

The cooling structure shown in FIGS. 10 and 11 has the disadvantage that the structural strength of the cooling plate can been reduced. In FIG. 12, a three layer cooling plate is shown, the arrangement of those slits in both the first cooling plate 101 and the second cooling plate 103 is preferable that the slits will perfectly fall on the waterways of the third cooling plate 102. For a three layer cooling structures, therefore, the reasonable cross-section area will be sealed properly and the overall mechanical strength is ensured as well.

As the structure of the first cooling plate 101 is identical with the second cooling plate 103, so take the first cooling plate 101 as an example to demonstrate the principle of eddy current resistance by using the slits:

The straight lines in FIG. 12 represent the slits, which divide the first cooling plate into two paths. The dotted arrow represents one path and the solid arrow represents the other. The arrows shown in the third cooling plate 102 depict the flow paths of the coolant, whereas the arrows shown in the first cooling plate 101 depict the eddy current paths. In addition, the vertical lines shown in the graph divided the first cooling plate 101 into 12 regions, under N, S poles, the number of regions are even-numbered, and make them in 6 pairs by combining every two adjacent regions together. In FIG. 12, when secondary leftward movement occurs, connect the like poles in each region (i.e. Reverse series connection) to effectively resist the induced electromotive force, thereby achieve the suppression of the eddy current.

There are two major circulation paths have been form by incorporating the slits on the first cooling plate 101:
Path 1 (solid arrow 302 in FIG. 12): 1→2→5→6→9→10→1; and Path 2 (dotted arrow in FIG. 12): 3→4→7→8→11→12→3.

Figure 13:
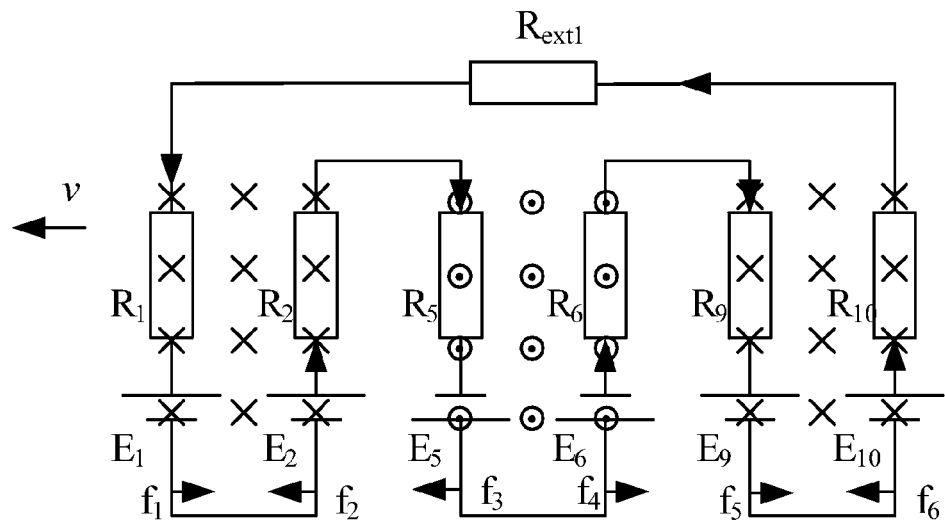
FIG. 13 depicts damping force calculation principle diagram of FIG. 12 cooling plate structure.

Take Path 1 for example, the calculation of damping force is shown below:

As shown in FIG. 13, the circuit in Path 1 consists of the relevant regions 1, 2, 5, 6, 9, 10 and peripheral closed regions, and their respective resistor are $R_1$, $R_2$, $R_5$, $R_6$, $R_9$, $R_{10}$ and $R_{ext1}$. The figure shows the field direction of each region, when AMLM secondary move leftward at speed V, the induced back electromotive force of each region are $E_1$, $E_2$, $E_5$, $E_6$, $E_9$ and $E_{10}$. The series of circuit and induced potential polarity indicate that $E_1$ and $E_2$, $E_5$ and $E_6$, $E_9$ and $E_{10}$ will offset each other. Due to the uneven distribution of the magnetic field, the back electromotive force cannot be fully offset. Assume the circulation of the remaining back electromotive force is shown in FIG. 12, then in each region the Lorentz force generated by the eddy current are $f_1$, $f_2$, $f_5$, $f_6$, $f_9$ and $f_{10}$ wherein $f_1$ and $f_2$, $f_5$ and $f_6$, $f_9$ and $f_{10}$ can mutual offset. The inter-regional back EMF offset each other, thus the damping force will be eventually reduced greatly by mutual offsetting the eddy current.

Based on the law of electromagnetic induction and taking the back EMF's reversal connection into account, the equation of back EMF is:

$$\begin{cases} f_n = lB \times i \ (n = 1, 2, 5, 6, 9, 10) \\ f_{eg} = f_1 + f_2 + f_5 + f_6 + f_9 + f_{10} \end{cases}$$

calculate the energizing length and sectional area according to the eddy current flow, and calculate the resistance of each portion base on the material resistivity, then get the total resistance: $R = R_1 + R_2 + R_5 + R_6 + R_9 + R_{10} + R_{ext1}$. Inductive back EMF divided by the total resistance is the value of the large loop eddy current, and calculate the corresponding damping force base on the law of Biot-Savary electromagnetic force will get:

$$\begin{cases} E_n = lB \times v \ (n = 1, 2, 5, 6, 9, 10) \\ E = E_1 + E_2 + E_5 + E_6 + E_9 + E_{10} \end{cases},$$

Base on the above method, the damping coefficient in different position of the prototype large loop eddy current can be calculated. It can be seen that the eddy current damping force is suppressed by offsetting EMFs and reversing eddy current in the large loop circuit.

Figure 14:
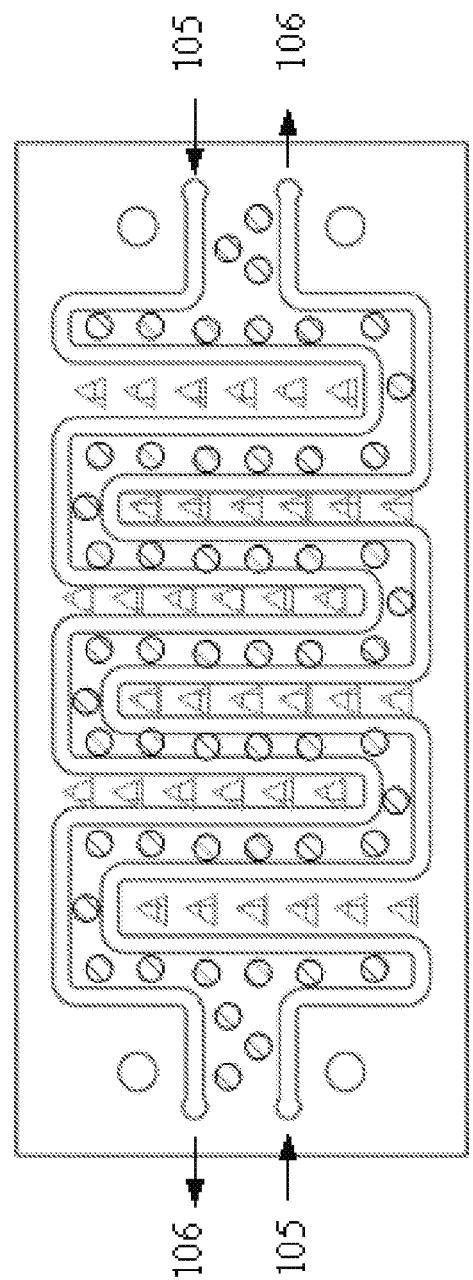
FIG. 14 depicts the distribution of the magnetic flux density in the third cooling plate.

The arrangement of those slits in both the first cooling plate 101 and the second cooling plate 103 is preferable that the slits will perfectly fall on the wall of waterways 102, which is used for resisting the eddy current. In FIG. 14, the circle and triangle represent the magnetic-field distribution, whereas other magnetic field can be ignored as their magnetic forces are approximate to zero. Specifically, the circled parts can follow the reversal connection of the EMF to resist the eddy current; and the triangle parts are eddy current closed loop, so as to realize the eddy current suppression.

Figure 15:
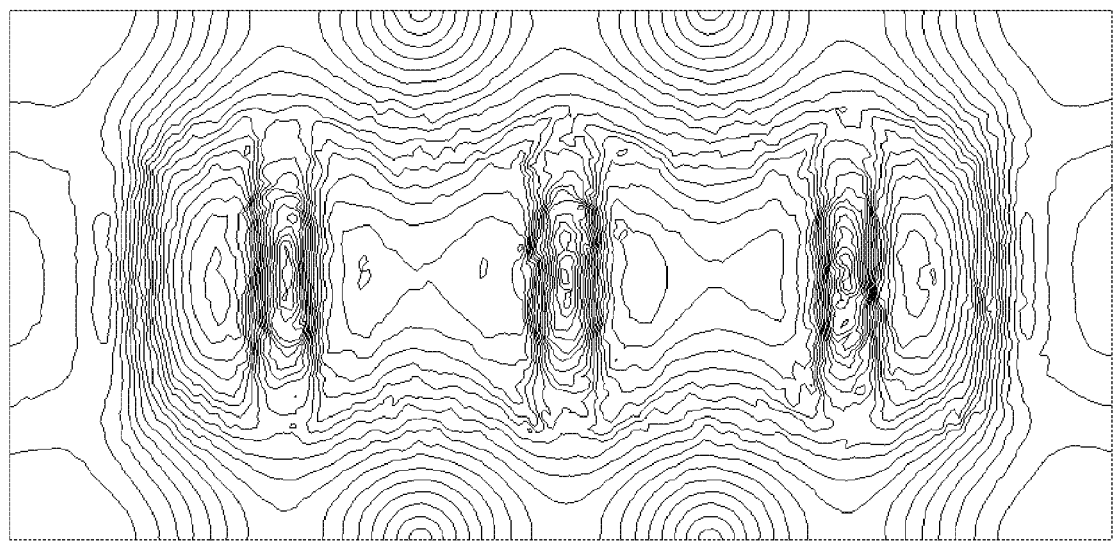
FIG. 15 depicts the distribution of eddy current density equipotential lines without suppression eddy current structure.
Figure 16:
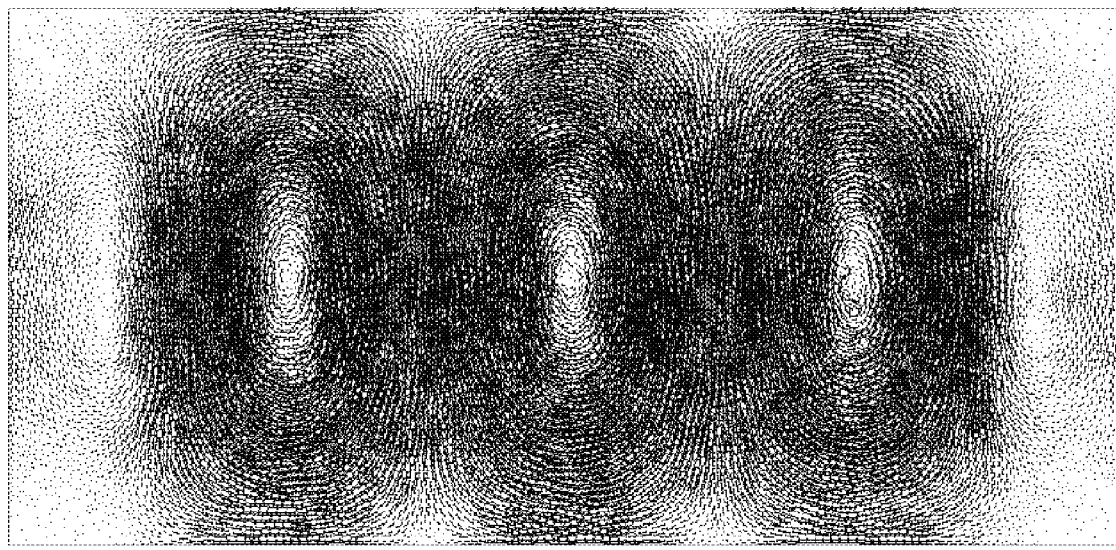
FIG. 16 depicts the distribution of eddy current without suppression eddy current structure.
Figure 17:
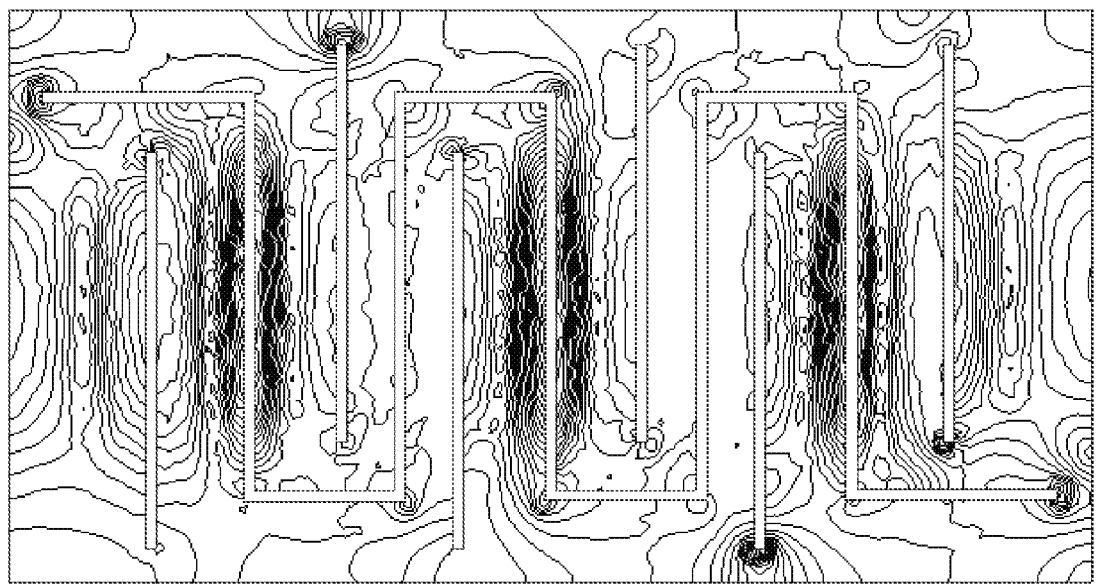
FIG. 17 depicts the distribution of eddy current density equipotential lines with suppression eddy current structure.
Figure 18:
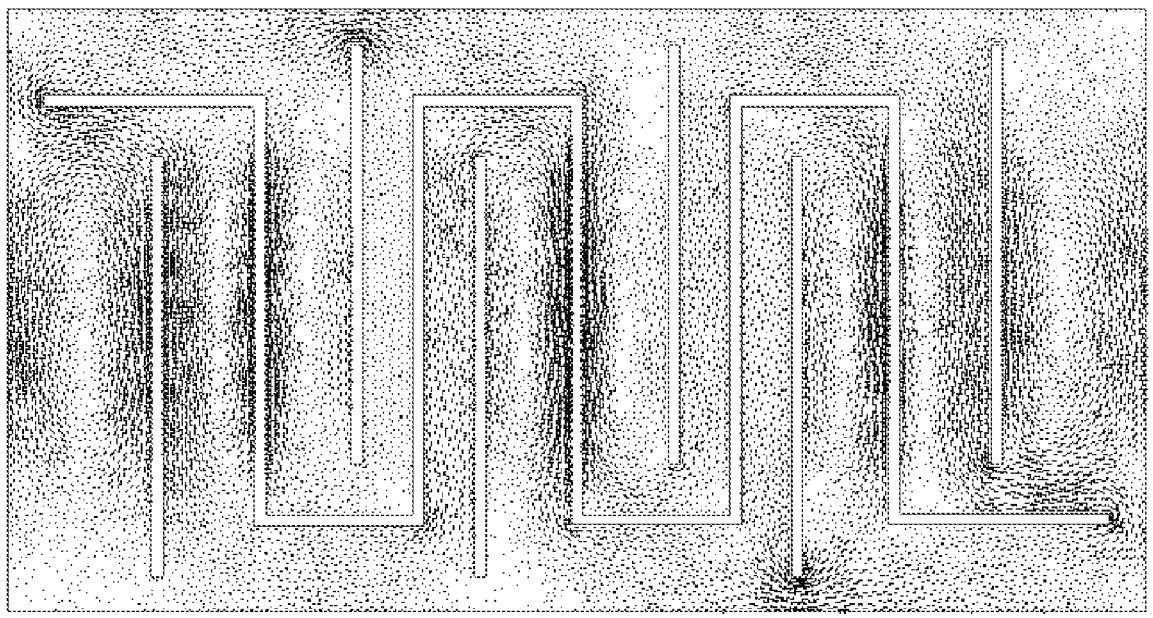
FIG. 18 depicts the distribution of eddy current without suppression eddy current structure.

FIGS. 17 and 18 illustrate the induced eddy current density equipotential lines and the induced eddy current flow after applying the present invention. In contrast with FIGS. 15 and 16 (which depict the induced eddy current density equipotential lines and the induced eddy current flow without applying the present invention) it can be seen that the new motor cooling and eddy current suppression structure 100 can effectively reduce the damping force by ⅚, thereby resist the eddy current in a efficient manner.

Figure 6:
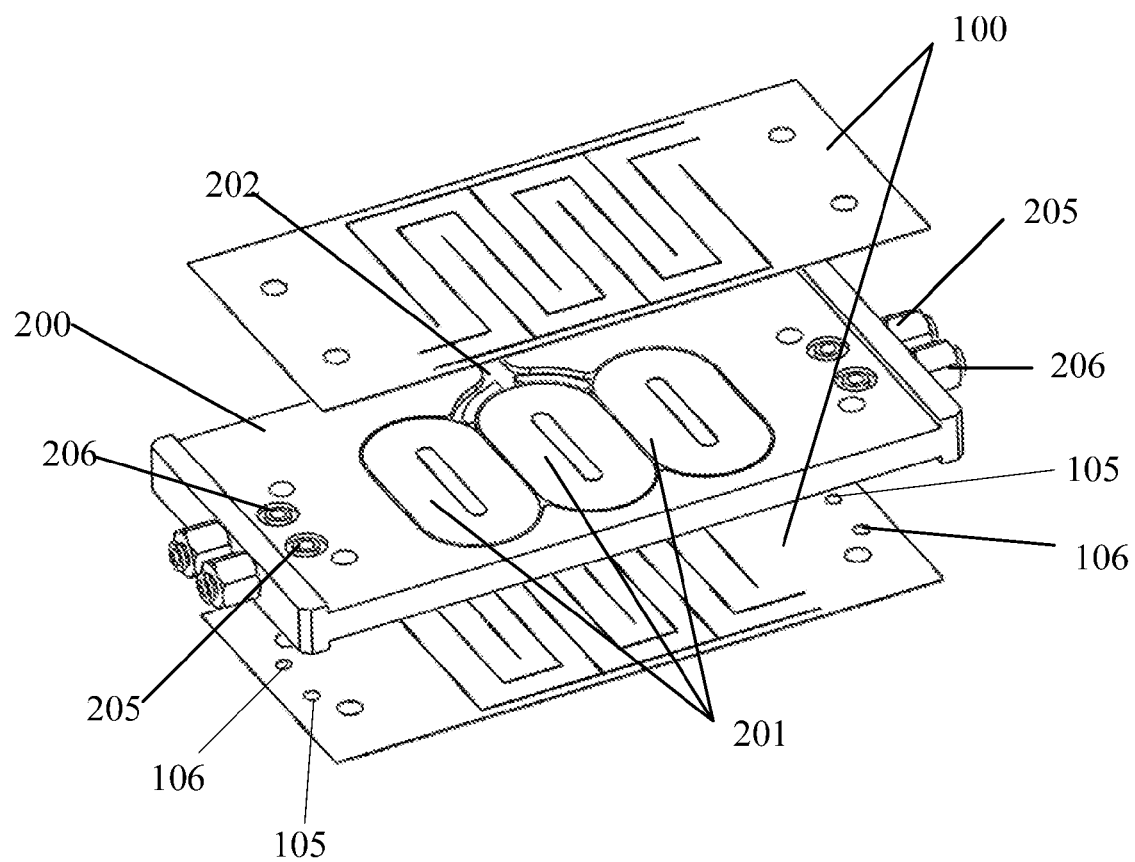
FIG. 6 depicts the structure of the novel type linear motor with cooling plate.

Furthermore, in order to more effectively suppress the temperature rise of the motor, attach the cooling structure 100 on both the top and bottom of the motor winding 201, as shown in FIG. 6. The gap between the new cooling structure 100 and motor winding 201 is filled with high thermal conductivity potting material for effectively increasing the cooling effect. In particular, the motor winding 201 is placed in a support body 200, and the two cooling structure 100 will be fixed on the top and bottom of the support body 200, in which it has inlet 205, outlet 206 and wire slot 202.

Figure 7:
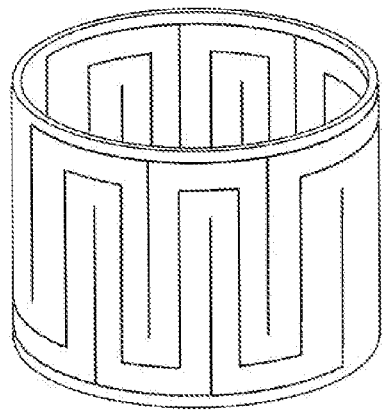
FIG. 7 depicts cooling system with the eddy current suppression structure in rotating motor.
Figure 8:
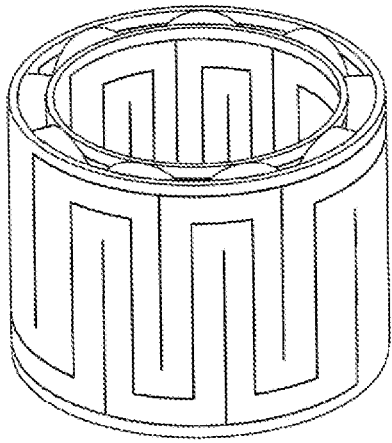
FIG. 8 depicts the rotating motor primary with cooling system which can suppress the eddy current.
Figure 9:
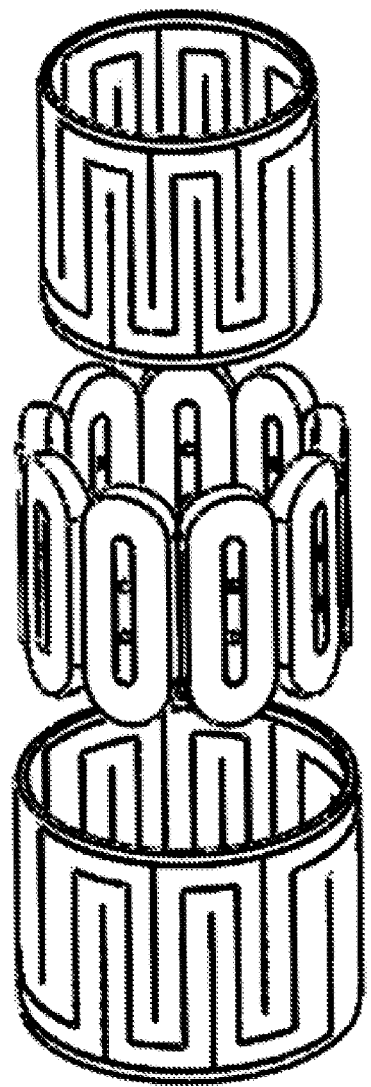
FIG. 9 depicts the Explosive view of rotating motor primary with the novel cooling system.

It is worth of note that the present invention 100 can be used in any type of motors, such as linear motor and rotating motor (i.e. roll up the existing motor cooling and eddy current suppression structure 100 to achieve rotary immersion coreless motor cooling program, shown as FIG. 7 to 9). With the aid of the new invention, the motor's temperature rise can be effectively reduced, and meanwhile the reliability of the motor and its thrust density can also be further improved.

While specific embodiments of the invention have been described above, it will be appreciated that this invention may be practiced otherwise than as described. As such, the description is not meant or intended to limit the invention in any way. Any modifications and variations where made in accordance with the contents of the present patent should be regard as technical scope of this invention.

What is claimed is:

1. A motor cooling and eddy current suppression structure, which is mounted on the surface of a motor winding, comprising:
   a first cooling plate, a second cooling plate and a cooling water circuit located between the first cooling plate and the second cooling plate; the cooling water circuit is configured to allow the cooling fluid to pass through; the first and the second cooling plates are both non-magnetic metallic materials;
   wherein one or more first slits being provided on the first cooling plate in the position where the motor poles are combined, and by which the first cooling plate is divided into a plurality number of individual first regions which are corresponding to each pole of the motor; each of the first regions being further divided into an even number of first sub-areas by at least one first sub-slit where induced electromotive force are generated, two adjacent first sub-areas in respective first regions are grouped together and the ends for each first sub-area that has same polarity are connected in series; and
   wherein one or more first slits being provided on the second cooling plate in the position where the motor poles are combined, and by which the second cooling plate is divided into a plurality number of individual second regions which are corresponding to each pole of the motor; each of the second regions being further divided into an even number of second sub-areas by at least one second sub-slit where induced electromotive force are generated, two adjacent second sub-areas in respective second regions are grouped together and the ends for each second sub-area that has same polarity are connected in series.

2. A motor cooling and eddy current suppression structure according to claim 1, wherein both a top surface and a bottom surface of the motor winding being attached with a motor cooling and eddy current suppression structure.

3. A motor cooling and eddy current suppression structure according to claim 1, wherein a third cooling plate, which is made of non-magnetic metallic materials, is provided between the first cooling plate and second cooling plate, and is being cut out the waterways and then using the sealant seal the first and second cooling plated on each side of the third cooling plate respectively such that the cooling water circuit is formed.

4. A motor cooling and eddy current suppression structure according to claim 3, wherein the waterways in the third cooling plate are arranged to be parallel to each other and distributed in a serpentine shape; with adjacent waterways have the opposite water flow.

5. A motor cooling and eddy current suppression structure according to claim 2, wherein the waterways are milled on one side of the second cooling plate; the first cooling plate is adhered to the side of the second cooling plate where the waterways are arranged, and the side of the first cooling plate that facing the second cooling plate is sealed by sealant such that the cooling water circuit is formed.

6. A motor cooling and eddy current suppression structure according to claim 5, wherein the milled waterways are arranged in parallel and are distributed in a serpentine shape on one side of second cooling plate with every adjacent waterway pair have the opposite water flow.

7. A motor cooling and eddy current suppression structure according to claim 1, wherein the first cooling plate and the second cooling plate are both made of non-magnetic stainless steel.

8. A motor cooling and eddy current suppression structure according to claim 3, wherein the first cooling plate, the second cooling plate and the third cooling plates are made of non-magnetic stainless steel.

9. A motor cooling and eddy current suppression structure according to claim 2, wherein a third cooling plate, which is made of non-magnetic metallic materials, is provided between the first cooling plate and second cooling plate, and is being cut out the waterways and then using the sealant seal the first and second cooling plated on each side of the third cooling plate respectively such that the cooling water circuit is formed.

10. A motor cooling and eddy current suppression structure according to claim 4, wherein the first cooling plate, the second cooling plate and the third cooling plates are made of non-magnetic stainless steel.

11. A motor cooling and eddy current suppression structure according to claim 6, wherein the first cooling plate and the second cooling plate are both made of non-magnetic stainless steel.

12. A motor cooling and eddy current suppression structure for a motor with poles comprising:
    a first cooling plate comprising:
        a non-magnetic metallic material;
        one or more first slits provided on the first cooling plate in a position where poles of a motor are combined;
        a plurality of first regions, each first region corresponding to each pole of a motor;
        a plurality of first sub-areas; and
        one or more first sub-slits;
        wherein the first slits dividing the first cooling plate into the first regions, each of the first regions being further divided into an even number of the first sub-areas by at least one of the first sub-slits where induced electromotive force is generated, two adjacent first sub-areas in respective, first regions are grouped together and ends of each first sub-area having the same polarity are connected in series;

a second cooling plate comprising:
  a non-magnetic metallic material;
  one or more second slits provided on the second cooling plate in a position where poles of a motor are combined;
  a plurality of second regions, each second region corresponding to each pole of a motor;
  a plurality of second sub-areas; and
  one or more second sub-slits;
  wherein the second slits dividing the second cooling plate into the second regions, each of the second regions being further divided into an even number of the second sub-areas by at least one of the second sub-slits where induced electromotive force is generated, two adjacent second sub-areas in respective second regions are grouped together and ends of each second sub-area having the same polarity are connected in series; and
a cooling circuit located between the first cooling plate and the second cooling plate, the cooling circuit allowing cooling fluid to pass through the first cooling plate and the second cooling plate.

13. The motor cooling and eddy current suppression structure according to claim 12, wherein the first cooling plate has a proximal side facing toward a proximal side of the second cooling plate when the first cooling plate and the second cooling plate are sealed to one another;
  wherein the cooling circuit is formed by cooperatively located cooling path channels formed in the proximal sides of the first cooling plate and the second cooling plate.

14. The motor cooling and eddy current suppression structure according to claim 12 further comprising a third cooling plate formed of a non-magnetic metallic material, the third cooling plate provided between the first cooling plate and second cooling plate and so located forming the cooling circuit.

15. The motor cooling and eddy current suppression structure according to claim 13, wherein the cooling circuit comprises two serpentine cooling paths, cooling fluid passing through each cooling path, but with opposite flow in each cooling path.

16. The motor cooling and eddy current suppression structure according to claim 14, wherein the third cooling plate comprises the cooling circuit, the third cooling plate having two serpentine cooling paths, cooling fluid passing through each cooling path, but with opposite flow in each cooling path.

* * * * *